United States Patent [19]

Schroeder et al.

[11] Patent Number: 4,930,091
[45] Date of Patent: May 29, 1990

[54] TRIANGLE CLASSIFICATION SETUP METHOD AND APPARATUS FOR 3-D GRAPHICS DISPLAY SYSTEM

[75] Inventors: Brian D. Schroeder, Lowell, Mass.; Michael F. Deering, Los Altos, Calif.

[73] Assignee: Schlumberger Systems, Inc., Sunnyvale, Calif.

[21] Appl. No.: 116,999

[22] Filed: Nov. 4, 1987

[51] Int. Cl.⁵ .............................................. G06F 3/14
[52] U.S. Cl. .................................. 364/522; 340/790; 340/799
[58] Field of Search ...................... 364/518, 561, 522; 340/739, 747, 790, 798, 799

[56] References Cited

U.S. PATENT DOCUMENTS

| | | | |
|---|---|---|---|
| 3,889,107 | 6/1975 | Sutherland | 364/518 X |
| 4,615,013 | 9/1986 | Yan et al. | 364/521 |
| 4,641,351 | 2/1987 | Preston, Jr. | 340/747 X |
| 4,709,231 | 11/1987 | Sakaibara et al. | 340/729 |
| 4,729,098 | 3/1988 | Cline et al. | 364/521 X |
| 4,730,261 | 3/1988 | Smith | 340/729 X |
| 4,752,828 | 6/1988 | Chapuis et al. | 364/521 X |
| 4,805,116 | 2/1989 | Liang et al. | 364/521 |
| 4,806,921 | 2/1989 | Goodman et al. | 340/747 |
| 4,819,192 | 4/1989 | Kuragano et al. | 340/728 X |

Primary Examiner—David L. Clark
Attorney, Agent, or Firm—David H. Carroll; Robert C. Colwell; Paul C. Haughey

[57] ABSTRACT

An improved method and apparatus for classifying triangles. A description of a triangle in the form of the coordinates of its vertices is supplied to calculation logic. The calculation logic calculates a plurality or parameters of the triangle from these coordinates. These parameters are then provided to a look-up table. The look-up table has previously been programmed to include at each address the proper triangle classification for that address, with each address being a different combination of the parameters. The addresses for the look-up table cover all possible combinations of the parameters, and thus all possible triangles.

13 Claims, 3 Drawing Sheets

WIDE BOTTOM: WB

FIG._3A.

WIDE TOP: WT

FIG._3B.

NEW LEFT: NL

FIG._3C.

NEW RIGHT: NR

FIG._3D.

TRIANGLE CLASSIFICATION SETUP METHOD AND APPARATUS FOR 3-D GRAPHICS DISPLAY SYSTEM

The Appendix is a computer program for computing a table to implement a portion of the triangle classification algorithm.

BACKGROUND

The present invention relates to classifying triangles into different categories for three-dimensional graphics displays.

Three-dimensional computer graphics displays are used to display images to a user as if he were observing a real world environment. These systems store in a data base a representation in three-dimensional coordinates of three-dimensional objects, as well as their color and other properties. Additional "environment" information including the number, color, location, and other properties of illumination sources, atmospheric properties, and many other details may also be specified. The display is produced after being provided with the desired viewing angle for the viewer. The system must calculate all the details of the image, including determining which objects obscure others from the viewer's point of view, and present them accordingly.

Figure 1:
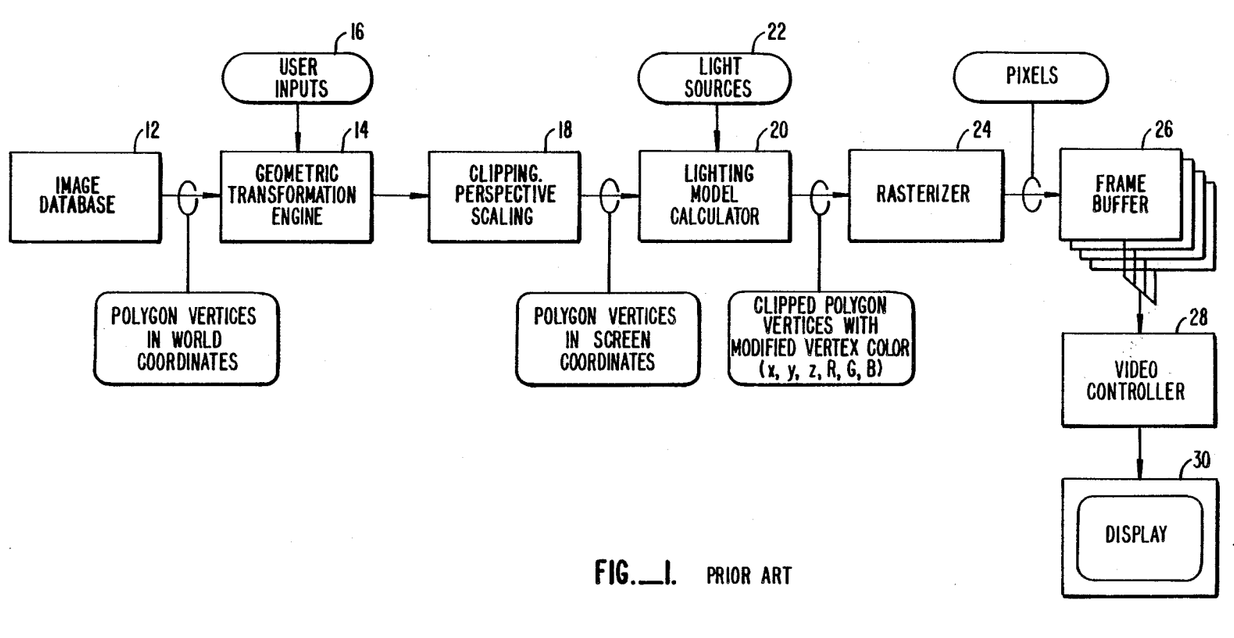
FIG. 1 is a block diagram of a prior art three-dimensional display processing system.

A typical graphics display system is shown in FIG. 1. An image data base 12 stores a description of the objects in the scene. The objects are described with a number of small polygons which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadralaterals, and the latter can always be decomposed into pairs of triangles.

A transformation engine 14 transforms the object coordinates in response to the angle of viewing selected by a user from user input 16. In addition, the user may specify the field of view, the size of the image to be produced, and the back end of the viewing volume so as to include or eliminate background as desired.

Once this viewing area has been selected, a clipping circuit 18 eliminates the polygons (i.e., triangles) which are outside the viewing area and "clips" the polygons which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model 20 is next applied taking into account the light sources 22. The polygons with their color values are then transmitted to a rasterizer 24.

For each polygon, rasterizer 24 determines which pixel positions are covered by the polygon and attempts to write the associated color values and depth (Z value) into frame buffer 26. Rasterizer 24 compares the depth values (Z) for the polygon being processed with the depth value of a pixel which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, video controller 28 displays the contents of frame buffer 26 on a display 30 a scan line at a time in raster order.

In order to aid the rasterizer in processing the polygons, the polygons are often classified by type. Where the polygons are triangles, for instance, if the triangle has a level bottom on a single scan line, the rasterizer will know that it can stop once it has reached the end of the left border, which may be marked by a change in slope. If, on the other hand, the slope of the left border changes because the triangle has a bottom at an angle, the rasterizer must keep rasterizing but with a different slope for the left boundary. If the rasterizer is provided with information on the triangle type, it will know what to do in these situations with minimal data. Typically, the classification of triangles is done by doing a series of calculations on the triangle data. For instance, the bottom two vertices may be compared to see if they are on the same scan line (same y coordinate). If not, a further test may be done to determine if one vertex is to the left of the other or to the right of the other. After passing through a series of tests, the classification of the triangle can eventually be determined.

In addition to classifying triangles, some triangles must be eliminated. For example, certain "degenerate" triangles should not be processed. Such triangles include triangles where all three vertices are on a single line, and thus the triangle is just a line. Alternately, the triangle may be so small that it does not enclose a pixel and would not show up in the display. Finally, there are "backfacing" triangles, which are triangles on the backside of a surface to be viewed. These triangles should also be eliminated since they will not be visible from a particular viewpoint. One can determine whether a triangle is backfacing if one can figure out the order of the vertices. In a typical system, the triangles are defined with the vertices in clockwise order from the viewing angle in which the triangle is visible. Thus, if a viewing angle is selected from the opposite side, where the triangle is not visible, the triangle vertices will be presented in counter-clockwise order. A determination of the clockwise or counter-clockwise nature of the data is performed to determine whether a triangle is backfacing and should be eliminated.

SUMMARY OF THE INVENTION

The present invention is an improved method and apparatus for classifying triangles. A description of a triangle in the form of the coordinates of its vertices is supplied to calculation logic. The calculation logic calculates a plurality or parameters of the triangle from these coordinates. These parameters are then provided to a look-up table. The look-up table has previously been programmed to include at each address the proper triangle classification for that address, with each address being a different combination of the parameters. The addresses for the look-up table cover all possible combinations of the parameters, and thus all possible triangles.

In a preferred embodiment, the triangles are classified into five classes: degenerate triangles which are deleted; wide bottom triangles which have a bottom edge which does not cross a y scan line; wide top triangles which have a top edge which does not cross a y scan line; new left triangles which have the vertex on the left side of the triangle between top and bottom vertices; and new right triangles which have a right side vertex between top and bottom vertices of the triangle.

For the parameters of the triangle, the edges are first computed as vectors from the vertices, with each edge being given a sign bit. Then, values representing whether a particular edge crosses an integral x or y boundary are calculated. From these values, the slopes of the edges can be calculated and then the slopes are compared to each other to produce a set of slope comparison parameters.

Preferably, when a triangle is provided to the computation logic, it includes a bit which indicates whether the vertices are arranged in clockwise or counter-clockwise order. This bit can be used to eliminate triangles which are backfacing and to aid in reordering the vertices where necessary. This reordering is necessary when the vertex information does not include the top left vertex as the first piece of information.

The present invention uniquely recognizes five categories of triangles which allow a rasterizer, especially a triangle processor, to more efficiently rasterize.

In addition, the present invention provides a look-up table system which vastly simplifies the logic and the calculation time for classifying triangles.

For a fuller understanding of the nature and advantages of the invention, reference should be made to the ensuing detailed description taken in conjunction with the accompanying drawings.

BRIEF DESCRIPTION OF THE DRAWINGS

FIGS. 3A-3E show five classes of triangles into which triangles are sorted by the present invention.

DETAILED DESCRIPTION OF THE PREFERRED EMBODIMENTS

Figure 2:
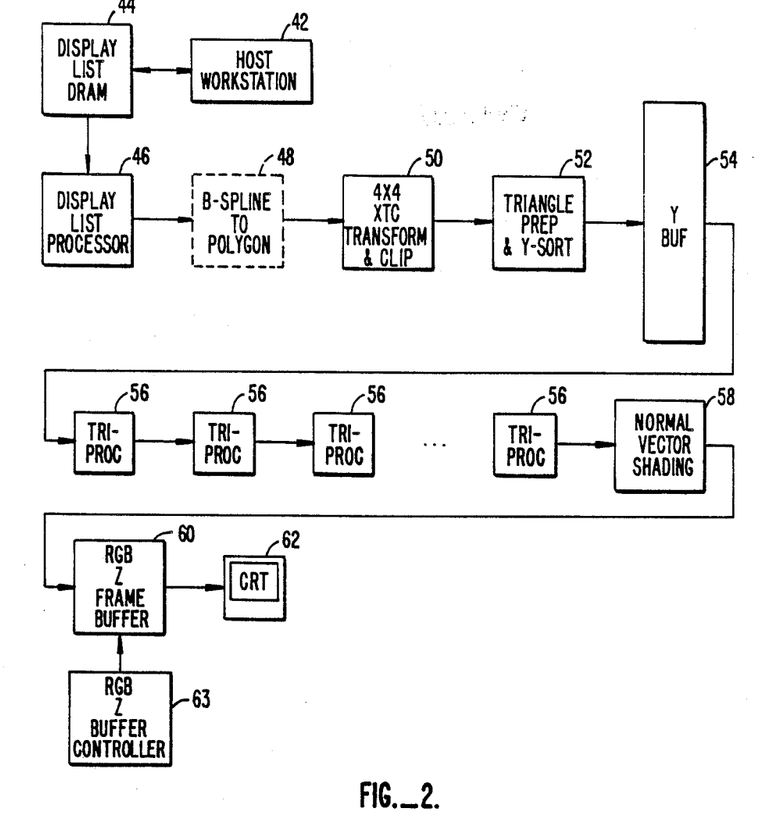
FIG. 2 is a block diagram of a three-dimensional graphics display processing system according to the present invention.

FIG. 2 is a block diagram of a graphics display processing system according to the present invention. A host work station 42 is coupled to a display list DRAM 44 and a display list processor 46. Host work station 42 loads display lists into display list DRAM 44 and edits the display lists as desired. Display list processor 46 interprets the display list code and outputs primitives, structures and commands to transform and clip unit (XTC) 50. Optionally, a B-spline to polygon processor 48 may be inserted if the display list is defined in terms of splines rather than polygons. Transform and clip circuit 50 transforms the triangle descriptions from model space to view space, then clips the triangles so that only the portion of triangles in the view area or the guardband area are passed along.

Triangle preparation and Y-sort circuit 52, in conjunction with Y buffer 54, sorts the triangles into scan line order. Each triangle is assigned to the scan line upon which it first appears. This circuitry keeps track of the number of triangles sent down the triangle pipeline as well as the number of triangle processors which are freed up in order to prevent an overflow condition. The triangle pipeline consists of a series of triangle processors 56 which are loaded with descriptions of particular triangles. The triangle processor then compares these descriptions to pixel positions as each scan line is traversed. The triangle processor then compares these descriptions to pixel positions as each scan line is traversed. The triangle processors output the proper value for each pixel to a normal vector shading circuit 58. This circuit provides the appropriate shading of the 3-D picture in accordance with chose angles of light, etc. The output of the normal vector shader is provided to an RGB Z buffer 60 and from there to a CRT 62. A frame buffer controller 63 compares the contents of frame buffer 60 to a new pixel value from a second pass through the triangle processor pipeline after an overflow. RGB Z frame buffer 60 and controller 63 may optionally be eliminated since the data is provided scan line by scan line ready for display. However, provision must then be made to handle overflows and assure that the load time for the triangles does not exceed the line flyback time of the CRT.

A triangle classification and assembly stage in unit 50 classifies triangles and lines and outputs data that will reorganize the points for the following stages. In order to do this, this stage needs to calculate certain of the parameters required in subsequent stages. This data will be transferred to help save calculations down-pipe.

The classification logic classifies triangles as being wide top, wide bottom, new right, new left, degenerate in y, or backfacing. It is here that backface rejection occurs, when enabled.

Triangle Classification Setup

The task of taking a triangle of arbitrary orientation and at high speed converting its vertices into the incremental rendering data needed by the triangle processors is a non-trivial task. In the prior art this sort of computation was handled as a large number of special cases by complex microcode utilizing a number of time consuming tests. In the present invention, a new method of rapidly classifying the triangles into one of five general classes with six parameterized orientations is employed.

Figure 3A:
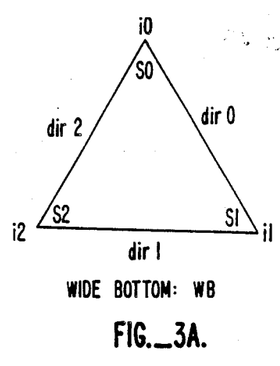

In FIGS. 3A-3E, the five general classes are presented. They are generally defined as follows:

3A. (WT) WIDE TOP: The top two vertices of the triangle fall between the same two integral y coordinates.

Figure 3B:
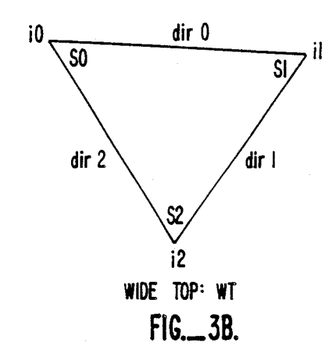

3B. (WB) WIDE BOTTOM: The bottom two vertices of the triangle fall between the same two integral y coordinates. (Note: The terms Wide Bottom and Wide Top are simply convenient designations, the bottoms and tops of these triangles could be very narrow.)

Figure 3C:
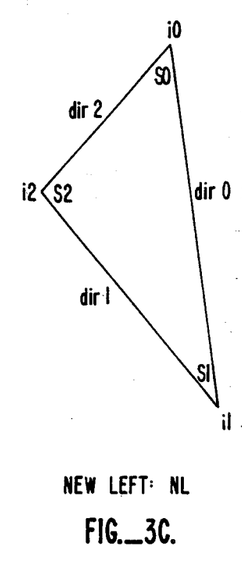

3C. (NL) NEW LEFT: All three vertices fall between different pairs of integral y coordinates, and the middle vertex is to the left of the line segment between the other two vertices.

Figure 3D:
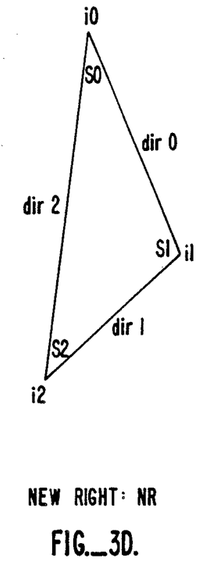

3D. (NR) NEW RIGHT: All three vertices fall between different pairs of integral y coordinates, and the middle vertex is to the right of the line segment between the other two vertices.

3E. (DG) DEGENERATE: No two vertices of the triangle are on different sides of both x and y integral boundaries. Such a triangle does not contain any valid sample points, and may be safely discarded.

In addition, the classification places the vertices in a unique order: one topmost vertex, the other two in clockwise order. This provides six different reorderings of three points. If the reordering included reversing the order between the vertices, then the triangle must be backfacing (assuming that all triangles were originally defined in clockwise order when front facing). This is a much more robust test of backfacing than the more usual testing of the normal vectors to the vertices or testing of the cross product of the vectors formed by two edges. The former won't work if no normals are provided, or if the normals bend across the face of the triangle. The latter requires significant extra computation, and can be unreliable for many near degenerate triangles.

The above definition cannot be employed directly to classify triangles in hardware, as it relies upon tests not directly available to the hardware (such as testing on which side of an edge a vertex lies). A method to obtain the semantically same classification with simple information will be described after some intermediate terms are described.

The triangle classification is used three ways: to weed out degenerate, corrupted, or backfacing triangles; to indicate which of the four parameter setup methods to employ (and as to which vertices), and to tell the triangle processors what class of triangle to rasterize.

Note that the triangle processors do not distinguish between WIDE_TOP and WIDE_BOTTOM classes. Because all triangle tops are always clipped to the uppermost scan line crossed, the triangle processor sees all triangles as starting with a wide top, and indeed if they also have a new left or new right vertice, the triangle processor really deals with them as a form of quadralateral.

The method starts with the three triangle vertices, p0, p1, and p2, with screen coordinates (x0,y0), (x1,y1), and (x2,y2), as output by the clipping section. From these values, a number of intermediate terms are computed for use in triangle classification. One of the strengths of the classification method is that most of terms will be used by the next processing stage for set-up of incremental rendering parameters for the triangle processors, and thus are available at little cost. In the following text, "=" indicates assignment, while "= =" indicates comparison.

First the edges of the triangle are computed as vectors with components (dx*,dy*):

| dx0 = x1 − x0 | dy0°= y1 − y0 |
| dx1 = x2 − x1 | dy1 = y2 − y1 |
| dx2 = x0 − x2 | dy2 = y0 − y2 |

(let sdx0, sdy0, sdx1, sdx2, sdy2 be the sign bits of these),

Then boolean values idx* and idy* are computed representing whether a particular edge crosses an integral x or y boundary:

idx0=integer (x0)= =integer (x1)

idx1=integer (x1)= =integer (x2)

idx2=integer (x2)= =integer (x0)

idy0=integer (y0)= =integer (y1)

idy1=integer (y1)= =integer (y2)

idy2=integer (y2)= =integer (y0)

Then the slopes m* of the edges are computed from dx* and dy*:

m0=dx0/dy0 m1=dx1/dy1 m2=dx2/dy2

Finally the slopes are compared, and the results of the comparisons are stored in the slope sense boolean bits s*:

s0=m2≧m0 s1=m0≧m1 s2=m1≧m2

With these values computed, the five triangle classifications can be precisely defined. In FIGS. 3A–3D, the points i0, i1, and i2 are some (as yet undetermined) permutation of p0, p1, and p2. CLASS DELETE(DT) is defined by:

| not ( | (idx0 = = 1 and idy0 = = 1) | or |
|       | (idx1 = = 1 and idy1 = = 1) | or |
|       | (idx2 = = 1 and idy2 = = 1) | ) |

This says at least one of the triangle's edges must cross integral boundaries in both x and y. Otherwise, the triangle is degenerate, such as a line or a triangle which is too small to cross a pixel position.

The class DELETE must be checked first. The other classifications assume that the conditions for DELETE do not hold. Any triangle in this class is deleted and not processed further.

CLASS Wide Bottom (WB) (FIG. 3A) is defined by:

idy1= =0 and not (DELETE)

This says that the edge between i1 and i2 must not cross a y scan line, e.g. result in a flat bottom when rasterized.

CLASS Wide Top (WT) (FIG. 3B) is defined by:

idy0= =0 and not (DELETE)

This says that the edge between i0 and i1 must not cross a y scan line, e.g. result in a flat top when rasterized.

| idy0 = = 1 and idy1 = = 1 and |
| idy2 = = 1 and sdy1 = = 1 and |
| s1 = = 1 and not (DELETE) |

This says that all three edges must each cross at least one y scan line, point i2 is above point i1 and on different scan lines, and that the edge between i1 and i2 is to the left of the edge between i0 and i1.

| idy0 = = 1 and idy1 = = 1 and |
| idy2 = = 1 and sdy1 = = 0 and |
| s1 = = 1 and not (DELETE) |

This says that all three edges must each cross at least one y scan line, point i2 is below point i1 and on different scan lines, and that the edge between i1 and i2 is to the right of the edge between i0 and i2.

This establishes the classifications, but not the assignments of vertices. Consider the 15 bit state vector represented by a concatenation of our boolean terms:

/s0/s1/s2/idx0/sdx0/idy0/sdy0/
idx1/sdx1/idy1/sdy1/idx2/sdx2/idy2/sdy2/

The five classes of triangles represent a complete and disjoint partition of the space defined by this state vector. In other words, the classification is completely unambiguous (e.g., no triangle is both of class NEW_RIGHT and class NEW_LEFT), and all possible triangles fall into one of the five classes. This means that if we exhaustively analyze all 32,768 possible triangles represented by the state vector, we can unambiguously place each one into one of the five classes, and furthermore, as a side effect of classification, determine the remapping of vertices. This is the key to the method: a ROM that takes as its address input this state vector, and outputs one of five triangle classes, and vertex reordering information. This can be represented by 10 bits of output, including a bit indicating that the reordering reversed the order of the vertices, indicating that the triangle was backfacing.

While this table could be constructed by hand, a computer program is a more effective method of determining the ROM contents. Such a program is shown in the Appendix. The program is completely based upon the classification formula described above, and the main complexities involve searching for possible reorderings of input endpoints.

Figure 4:
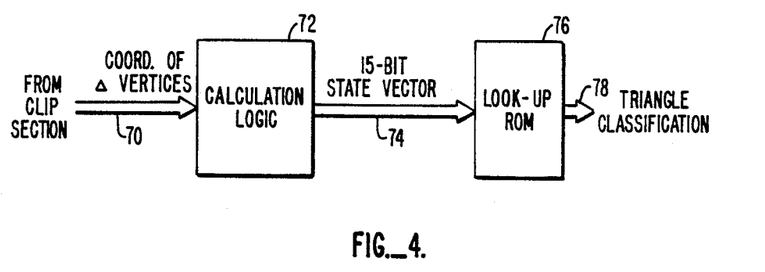
FIG. 4 is a block diagram of a triangle classification circuit according to the present invention.

FIG. 4 shows a block diagram of a classification system according to the present invention. The coordinates of the triangle vertices are provided on an input line 70 to calculation logic 72. Logic 72 performs a calculation set forth above and provides a 15 bit state vector (plus a clockwise, counter-clockwise bit if desired) on a line 74 to a look-up ROM 76. The addresses of look-up ROM 76 cover all possible combinations of the 15 bit state vector and provide as an output on line 78 the triangle classification. The system of FIG. 4 is provided as part of block 50 of FIG. 2 after the clipping logic.

As will be understood by those familiar with the art, the present invention may be embodied in other specific forms without departing from the spirit or essential characteristics thereof. For example, new left and new right triangles could be split into two triangles, one wide bottom and one wide top. Alternately, other parameters could be used for the state vector. Accordingly, the disclosure of the preferred embodiment of the invention is intended to be illustrative, but not limiting, of the scope of the invention which is set forth in the following claims.

```
/*
 *
 * Now we need to find the harder cases, new left and new right.
 */
        if (sdy[1] && !ss[1])
        {       /* y2-y1<=0;  y2 above y1 */
                /* mxy[1] > mxy[0]  new left and cw*/
                class = NL;
                p0=p[0]; p1=p[1]; p2=p[2];
                bf = ccw;       /*if ccw then back facing*/
                return(bf<<10 | class<<6 | p0<<4 | p1<<2 | p2);
        }
        if (sdy[1] && ss[1])
        {       /* y2-y1<=0;  y2 below y1 */
                /* mxy[1] <= mxy[0]  new right and ccw*/
                class = NR;
                p0 = p[0]; p1 = p[2]; p2 = p[1];
                bf = !ccw;
                return(bf<<10 | class<<6 | p0<<4 | p1<<2 | p2);
        }
        if (!sdy[1] && !ss[1])
        {       /* y2-y1>0;  y2 below y1 */
                /* mxy[1] > mxy[0]  new left and ccw*/
                class = NL;
                p0=p[0]; p1=p[2]; p2=p[1];
                bf = !ccw;      /*if !ccw then back facing*/
                return(bf<<10 | class<<6 | p0<<4 | p1<<2 | p2);
        }
        if (!sdy[1] && ss[1])
        {       /* y2-y1>0;  y2 below y1 */
                /* mxy[1] <= mxy[0]   new right and cw*/
                class = NR;
                p0 = p[0]; p1 = p[1]; p2 = p[2];
                bf = ccw;
                return(bf<<10 | class<<6 | p0<<4 | p1<<2 | p2);
        }
        return (ERROR<<6);
}  /* end of classify */
```

```
/*
 * This file contains routines to create the triangle
 * orientation look-up information for use in the Triangle
 * Digestion Module for the GSP-2 3D shaded polygon system.
 *
 * Brian Schroeder, September 14, 1987
 * BMW_AG project
 *
 * based on the routine mktri_table by
 * Michael F. Deering 3/29/85
 * GSP Systems Project
 *
 *
 */

*
/* In the following examples the dir flags are equal to the four bit
 * value sdx, sdy, idx, and idy. All examples are shown in the fashion
 * that will be output. The i bits shown include the slope sense bit, ss.
 *
 * CLASS Wide Bottom: WB: 0
 *
 *
 *
 *        i0 /\
 *          /  \ dir 0
 *     dir2/    \
 *        /      \
 *       i2-------i1
 *           dir1
 *
 *
 *
 * CLASS Wide Top: WT: 1
 *
 *                       dir0
 *                   i0------i1
 *                    \s0  s1/
 *                 dir2\    /dir1
 *                      \s2/
 *                       i2
 *
 *
 * CLASS New Left: NL: 2
 *
 *                    i0
 *                   /s0\
 *              dir2/    \
 *                 /s2    \
 *                i2       \dir0
 *                  \       \
 *              dir1\        \
 *                   \s1\
 *                      \ \
 *                       i1
 *
 *
 * CLASS New Right: NR: 3
 *
 *                       i0
```

```
*                /s0\
*               /   \dir0
*              /     \
*         dir2/  s1 i1
*            /   /
*           /   /dir1
*          /s2/
*         / /
*         i2
*
*
*
* The coordinate system used here is an inverted one, with the origin
* at the upper left of the screen or window. X increases to the right
* and Y increases DOWN.
*
* The basic problem here is to assign the topmost point, and then the
* remainder of the points in a clockwise fashion. The topmost point
* uses sdy (sign of dy, sdy=1 if dy <= 0) to solve the following ifs
*
*     if (y0<y1 && y0<y2) /* y0 topmost (y increases down)
*     if (y1<y2 && y1<y0) /* y1 topmost (y increases down)
*     if (y2<y0 && y2<y1) /* y2 topmost (y increases down)
*
* This becomes:
*
*     if (!sdy0 && sdy2) /* ((y1-y0 > 0) && (y0-y2 <= 0))
*     if (!sdy1 && sdy0) /* ((y2-y1 > 0) && (y1-y0 <= 0))
*     if (!sdy2 && sdy1) /* ((y0-y2 > 0) && (y2-y1 <= 0))
*
* In addition to this we use a 6 bit code flagging the integer value
* of (x,y) at each point as expressed in the following fragment of code:
*
*     idx0 = ((int)x0 == (int)x1) ? 0 : 1;
*     idx1 = ((int)x1 == (int)x2) ? 0 : 1;
*     idx2 = ((int)x2 == (int)x0) ? 0 : 1;
*     idy0 = ((int)y0+1 == (int)y1+1) ? 0 : 1;
*     idy1 = ((int)y1+1 == (int)y2+1) ? 0 : 1;
*     idy2 = ((int)y2+1 == (int)y0+1) ? 0 : 1;
*
* so that the i flag for each x,y pair depends on whether or not the
* vector comprising that pair crosses any of the vertical or horizontal
* lines. Note that the y value has 1 added to it, this is what the
* hardware will do in order to provide the appropriate scanline, next
* lower, in an integer, therefore these integer values will be the
* compared values for y.
*
* For any non-degenerate triangle, at least one edge must cross
* both an x and a y line. Therefore:
*
*   if (!((idy0 && idx0) || (idy1 && idx1) || (idy2 && idx2))) class = DELETE;
*
* If the triangle is determined to be of type wide top (idy to either
* side of the winning point = 0) a test on sdx needs to be done
* to find the leftmost point. Otherwise the topmost point becomes
* p0, and the triangle is traversed clockwise from there.
*
```

```
* If the triangle is of class New Left or New Right, the slope sense
* bits at need to be tested to determine the triangles actual
* orientation. This is because it is necessary to find which of the two
* remaining points is upper most, and whether that point is is to the
* left or right of the LINE between p[0] and the lowest point. The
* slope sense is a comparision of the inverse slopes, Mxy0,1,2. If p[1]
* is above p[2] then if Mxy1 > Mxy0 the triangle is of type new left.
* ss0 is the sign of the comparison of the two lines flanking p0, etc.
* ss1 is clear if Mxy1 > Mxy0 for example, where Mxy0 describes the line
* from p1 to p0 and Mxy1 describes the line from p2 to p1. If Mxy1 is
* greater then Mxy0, and p0 is above p1, then we have a new left
* triangle.
*
* Finally, the triangle is classified, and if the traversal direction is
* reversed and the input is not ccw, the triangle is backfacing.
* Similiarly, if the direction is not reversed and the input is ccw the
* triangle is backfacing.
*
*/ include <stdio.h>

FILE *IN;

/* The case lables for triangle cases */
#define WB    0
#define WT    1
#define NL    2
#define NR    3

/*use bit 3 to flag errors or deleted cases */
#define DELETE 14
#define ERROR 15

/*
 *   The table input is organized as follows:
 *
 *     1    1    1    1    4     4     4   = 16 => 2^16 = 65536
 *    |ccw|ss0|ss1|ss2|dir0|dir1|dir2|
 *     15   14   13   12   08    04    00
 *
 * where dir = sdx sdy idx idy
 *
 *   The table output is:
 *
 *     1      4    2  2  2   = 11 bits
 *    |bf|class|i0|i1|i2|
 *     10     06   04 02 00
 *
 */ short     tri_table[65536];
/*
```

```
 * The main routine generates all possible triangle cases.
 * Each case is passed to the triangle class pattern
 * recogniser (the routine classify) which will return the
 * table entry. Finally, the table is written
 * out to the file ''tri_table'' in the current directory.
 */
main()
{
        int     i, j, stat;
        for(i=0;i<65536;i++) tri_table[i] = ERROR<<6;

for (i = 0;i < 65536; i++) tri_table[i] = classify(i);

/* The following two loops take some statistics for checking purposes.
 * Note that there should be no ERROR cases.
 */
        for(i=stat=0;i<65536;i++)
            if((j=tri_table[i]) == (ERROR<<6)) stat++;
        printf("total non-defined cases = %d\n",stat);

for(i=stat=0;i<65536;i++)
            if(tri_table[i] != (DELETE<<6)) stat++;
        printf("Total non-degen defined cases %d out of 65536 (%f%%)\n",stat,
                ((double) stat)/655.36);

/* write the table out to the file. */ if((IN = fopen("BDS_tri_table", "w"))==NULL) {
            fprintf(stderr, "Cannot open file tri_table\n");
            exit(1);
                } fwrite(&tri_table[0], sizeof(tri_table), 1, IN);

fclose(IN);
} /* end of main */

/*
 * The routine classify matches the input triangle information against
 * each of the possible triangle classes. If a match is found,
 * the table entry is returned, otherwise the class ERROR is returned.
 */ classify(index)

/* inputs */
int     index;

{
        int     ccw;
        int     ss0, ss1, ss2;
        int     sdx0, sdx1, sdx2;
        int     sdy0, sdy1, sdy2;
        int     idx0, idx1, idx2;
```

```
int     idy0, idy1, idy2;

/* outputs */
int     p0, p1, p2;
int     class, bf;

/* sorted stuff */
int     sdx[3],sdy[3],idx[3],idy[3];
int     p[3],ss[3];

ccw = (index>>15) & 1;
ss0 = (index>>14) & 1;
ss1 = (index>>13) & 1;
ss2 = (index>>12) & 1;
sdx0 = (index>>11) & 1;
sdy0 = (index>>10) & 1;
idx0 = (index>>9) & 1;
idy0 = (index>>8) & 1;
sdx1 = (index>>7) & 1;
sdy1 = (index>>6) & 1;
idx1 = (index>>5) & 1;
idy1 = (index>>4) & 1;
sdx2 = (index>>3) & 1;
sdy2 = (index>>2) & 1;
idx2 = (index>>1) & 1;
idy2 = index & 1;

if (!((idx0 && idy0) || (idx1 && idy1) || (idx2 && idy2)))
        return (DELETE<<6);     /* a visible triangle has to have at
                                 * least one edge that crosses both
                                 * an x and a y scan line!
                                 */

/*build tables and get the points reorganized*/ if (!sdy0 && sdy2)  /* ((y1-y0 > 0) && (y0-y2 <= 0)) */
                    /* y0 is topmost */
{
    ss[0]=ss0;  ss[1]=ss1;  ss[2]=ss2;
    sdx[0]=sdx0; sdx[1]=sdx1; sdx[2]=sdx2;
    sdy[0]=sdy0; sdy[1]=sdy1; sdy[2]=sdy2;
    idx[0]=idx0; idx[1]=idx1; idx[2]=idx2;
    idy[0]=idy0; idy[1]=idy1; idy[2]=idy2;
    p[0]=0;p[1]=1;p[2]=2;
} if (!sdy1 && sdy0)  /* ((y2-y1 > 0) && (y1-y0 <= 0)) */
                    /* y1 is topmost */
{
    ss[0]=ss1;  ss[1]=ss2;  ss[2]=ss0;
    sdx[0]=sdx1; sdx[1]=sdx2; sdx[2]=sdx0;
    sdy[0]=sdy1; sdy[1]=sdy2; sdy[2]=sdy0;
    idx[0]=idx1; idx[1]=idx2; idx[2]=idx0;
    idy[0]=idy1; idy[1]=idy2; idy[2]=idy0;
    p[0]=1;p[1]=2;p[2]=0;
}
```

```
if (!sdy2 && sdy1) /* ((y0-y2 > 0) && (y2-y1 <= 0)) */
                   /* y2 is topmost */
{
   ss[0]=ss2; ss[1]=ss0; ss[2]=ss1;
   sdx[0]=sdx2; sdx[1]=sdx0; sdx[2]=sdx1;
   sdy[0]=sdy2; sdy[1]=sdy0; sdy[2]=sdy1;
   idx[0]=idx2; idx[1]=idx0; idx[2]=idx1;
   idy[0]=idy2; idy[1]=idy0; idy[2]=idy1;
   p[0]=2;p[1]=0;p[2]=1;
} if (!idy[1])
{   /*wide bottom case */
    class = WB;
    if (sdx[1])
    {   /* x2 - x1 <= 0, x2 is leftmost and triangle is cw */
        p0 = p[0]; p1 = p[1]; p2 = p[2];
        bf = ccw; /* if ccw then bf = 1, else not bf */
        return(bf<<10 | class<<6 | p0<<4 | p1<<2 | p2);
    }
    else
    {   /* (x2-x1 > 0) x1 is leftmost and triangle is ccw */
        p0 = p[0]; p1 = p[2]; p2 = p[1];
        bf = !ccw;        /* if ccw then bf = 0, else bf */
        return(bf<<10 | class<<6 | p0<<4 | p1<<2 | p2);
    }}
if (!idy[0])
{       /* wide top case 0 and 1 on top */
    class = WT;
    if (!sdx[0])
    {   /* (x1-x0 > 0) x0 is leftmost and triangle is cw */
        p0 = p[0]; p1 = p[1]; p2 = p[2];
        bf = ccw; /* if ccw then bf = 1, else not bf */
        return(bf<<10 | class<<6 | p0<<4 | p1<<2 | p2);
    }
    else
    {   /* (x1-x0 <= 0) x1 is leftmost and triangle is ccw */
        p0 = p[1]; p1 = p[0]; p2 = p[2];
        bf = !ccw;        /* if ccw then bf = 0, else bf */
        return(bf<<10 | class<<6 | p0<<4 | p1<<2 | p2);
    }}
else if (!idy[2])
{       /* wide top case 0 and 2 on top */
    class = WT;
    if (sdx[2])
    {   /* x0-x2 <= 0; x0 leftmost and triangle is ccw */
        p0 = p[0]; p1 = p[2]; p2 = p[1];
        bf = !ccw;        /* if ccw then bf = 0, else bf */
        return(bf<<10 | class<<6 | p0<<4 | p1<<2 | p2);
    }
    else
    {   /* (x0-x2 > 0) x2 is leftmost and triangle is cw */
        p0 = p[2]; p1 = p[0]; p2 = p[1];
        bf = ccw; /* if ccw then bf = 1, else not bf */
        return(bf<<10 | class<<6 | p0<<4 | p1<<2 | p2);
    }}
```

What is claimed is:

1. A method for classifying triangles based upon the coordinates of the vertices of a triangle, comprising the steps of:

determining a plurality of parameters describing a triangle which can be calculated from said coordinates of said vertices, wherein one set of said parameters is a plurality of values indicating whether a particular edge of said triangle crosses an integral x or y boundary;

determining a triangle classification for every combination of at least a portion of said parameters;

storing in a look-up table said determined triangle classifications with said combinations of parameters as addresses;

calculating a plurality of parameters of said triangle from said coordinates of said vertices; and determining the classification of said triangle by applying at least a portion of said parameters to said look-up table.

2. A method for classifying triangles based upon the coordinates of the vertices of a triangle, comprising the steps of:

determining a plurality of parameters describing a triangle which can be calculated from said coordinates of said vertices, wherein one set of said parameters is the values of the slopes of the edges of said triangle, and wherein said parameters further comprise values representing the comparison of said slopes to each other;

determining a triangle classification for every combination of at least a portion of said parameters;

storing in a look-up table said determined triangle classifications with said combinations of parameters as addresses;

calculating a plurality of parameters of said triangle from said coordinates of said vertices; and determining the classification of said triangle by applying at least a portion of said parameters to said look-up table.

3. A method for classifying triangles based upon the coordinates of the vertices of a triangle, comprising the steps of:

determining a plurality of parameters describing a triangle which can be calculated from said coordinates of said vertices, wherein each said triangle is further described with a bit indicating whether said vertices were originally arranged in clockwise or counter-clockwise order when viewing a front surface of the triangle;

determining a triangle classification for every combination of at least a portion of said parameters;

storing in a look-up table said determined triangle classifications with said combinations of parameters as addresses;

calculating a plurality of parameters of said triangle from said coordinates of said vertices; and determining the classification of said triangle by applying at least a portion of said parameters to said look-up table.

4. The method of claim 3 further comprising the step of determining whether said triangle is backfacing by comparing said clockwise, counter-clockwise bit to a current order of said vertices.

5. The method of claim 4 further comprising the step of eliminating backfacing triangles for triangles on a single-sided surface.

6. A method for classifying triangles based upon the coordinates of the vertices of a triangle, comprising the steps of:

determining a plurality of parameters describing a triangle calculated from said coordinates of said vertices;

determining a triangle classification for every combination of at least a portion of said parameters, said triangle classifications including wide bottom triangles having a bottom edge which does not cross a y scan line, wide top triangles wherein a top edge of a triangle does not cross a y scan line, new left triangles wherein all three edges of a triangle cross at least one y scan line and said triangle has a left side vertex between top and bottom vertices, new right triangles wherein all three edges of a triangle cross at least one y scan line and said triangle has a right side vertex between top and bottom vertices;

storing in a look-up table said determined triangle classifications with said combinations of parameters as addresses;

calculating a plurality of parameters of said triangle from said coordinates of said vertices; and determining the classification of said triangle by applying at least a portion of said parameters to said look-up table.

7. A method for classifying triangles based upon the coordinates of the vertices of a triangle, comprising the steps of:

determining a plurality of parameters describing a triangle calculated from said coordinates of said vertices, said parameters including vectors representing edges of said triangles in the order the vertices are presented, the sign of each of said edges, a plurality of values indicating whether a particular edge of said triangle crosses an integral x or y boundary, the values of the slopes of the edges of said triangle, and values representing the comparison of said slopes to each other;

determining a triangle classification for every combination of at least a portion of said parameters;

storing in a look-up table said determined triangle classifications with said combinations of parameters as addresses;

calculating a plurality of parameters of said triangle from said coordinates of said vertices; and determining the classification of said triangle by applying at least a portion of said parameters to said look-up table.

8. An apparatus for classifying triangles from an input of the coordinates of the vertices of a triangle, comprising:

calculation logic means for calculating a plurality of parameters of said triangle from said input of said coordinates, wherein one set of said parameters is a plurality of values indicating whether a particular edge of said triangle crosses an integral x or y boundary; and look-up table means, coupled to an output of said calculation logic means, for determining a triangle classification for every combination of at least a portion of said parameters, said look-up table means storing said triangle classifications with addresses corresponding to combinations of said parameters.

9. An apparatus for classifying triangles from an input of the coordinates of the vertices of a triangle, comprising:

calculation logic means for calculating a plurality of parameters of said triangle from said input of said coordinates, one set of said parameters being the values of the slopes of the edges of said triangle, and said parameters also including values representing the comparison of said slopes to each other; and look-up table means, coupled to an output of said calculation logic means, for determining a triangle classification for every combination of at least a portion of said parameters, said look-up table means storing said triangle classifications with addresses corresponding to combinations of said parameters.

10. An apparatus for classifying triangles from an input of the coordinates of the vertices of a triangle, comprising:

calculation logic means for calculating a plurality of parameters of said triangle from said input of said coordinates, each said triangle being further described with a bit indicating whether said vertices were originally arranged in clockwise or counter-clockwise order when viewing a front surface of the triangle; and look-up table means, coupled to an output of said calculation logic means, for determining a triangle classification for every combination of at least a portion of said parameters, said look-up table means storing said triangle classifications with addresses corresponding to combinations of said parameters.

11. The apparatus of claim 10 further comprising means for determining whether said triangle is backfacing from said clockwise, counter-clockwise bit.

12. An apparatus for classifying triangles from an input of the coordinates of the vertices of a triangle, comprising:

calculation logic means for calculating a plurality of parameters of said triangle from said input of said coordinates; and look-up table means, coupled to an output of said calculation logic means, for determining a triangle classification for every combination of at least a portion of said parameters, said look-up table means storing said triangle classifications with addresses corresponding to combinations of said parameters, said triangle classifications including degenerate triangles which do not have an edge crossing an integral boundary in both x and y directions, wide bottom triangles having a bottom edge which does not cross a y scan line, wide top triangles wherein a top edge of a triangle does not cross a y scan line, new left triangles wherein all three edges of a triangle cross at least one y scan line and said triangle has a left side vertex between top and bottom vertices, and new right triangle wherein all three edges of said triangle cross at least one y scan line and said triangle has a right side vertex between top and bottom vertices.

13. An apparatus for classifying triangles from an input of the coordinates of the vertices of a triangle, comprising:

calculation logic means for calculating a plurality of parameters of said triangle from said input of said coordinates, said parameters including vectors representing edges of said triangle in the order the vertices are presented, the sign of each of said edges, a plurality of values indicating whether a particular edge of said triangle crosses an integral x or y boundary, the values of the slopes of the edges of said triangle, and values representing the comparison of said slopes to each other; and look-up table means, coupled to an output of said calculation logic means, for determining angle classification for every combination of at least a portion of said parameters, said look-up table means storing said triangle classification with addresses corresponding to combinations of said parameters.

* * * * *